United States Patent [19]

Lanigan et al.

[11] Patent Number: 4,667,834
[45] Date of Patent: May 26, 1987

[54] CRANE APPARATUS HAVING HYDRAULIC CONTROL SYSTEM

[75] Inventors: William P. Lanigan, Orlando, Fla.; John J. Lanigan, Jr., Tinley Pk.; Myron Glickman, Morton Grove, both of Ill.

[73] Assignee: Mi-Jack Products, Inc., Hazel Crest, Ill.

[21] Appl. No.: 747,258

[22] Filed: Jun. 21, 1985

[51] Int. Cl.$^4$ ............................................. B66C 13/12
[52] U.S. Cl. .................................. 212/159; 212/131; 212/218
[58] Field of Search ............... 212/131, 159, 162–164, 212/171, 174, 205, 216, 217, 218–220; 318/801; 180/53.5, 65.4

[56] References Cited

U.S. PATENT DOCUMENTS

| | | | |
|---|---|---|---|
| 1,781,281 | 11/1930 | Hogrebe | 212/131 |
| 2,936,907 | 5/1960 | Woodruff | 212/219 |
| 3,059,782 | 10/1962 | Baudhuin | 212/218 |
| 3,760,591 | 9/1973 | Gordon | 212/159 |
| 3,888,356 | 6/1975 | Redelfs | 212/219 |
| 4,378,072 | 3/1983 | Appleman et al. | 212/218 |
| 4,433,952 | 2/1984 | Glickman | 212/218 |

OTHER PUBLICATIONS

Tower Whirler, Engineering News Record, 10/4/1917, Dravo-Doyle Company, Pittsburgh.

Primary Examiner—Joseph F. Peters, Jr.
Assistant Examiner—Stephen P. Avila
Attorney, Agent, or Firm—George H. Gerstman

[57] ABSTRACT

A crane apparatus having a hydraulic system for controlling the operation of the hoist and bridge, and gantry drive functions of the equipment. The hoist, bridge and drive components are driven by an AC motor that is powered by an AC generator. The AC motor in turn operates a variable displacement hydraulic pump which is variable from zero to a maximum flow rate in either direction for infinite speed control. The output of the hydraulic pumps is directed to respective hydraulic motors which drive the particular function being controlled.

14 Claims, 8 Drawing Figures

U.S. Patent  May 26, 1987  Sheet 1 of 7  4,667,834
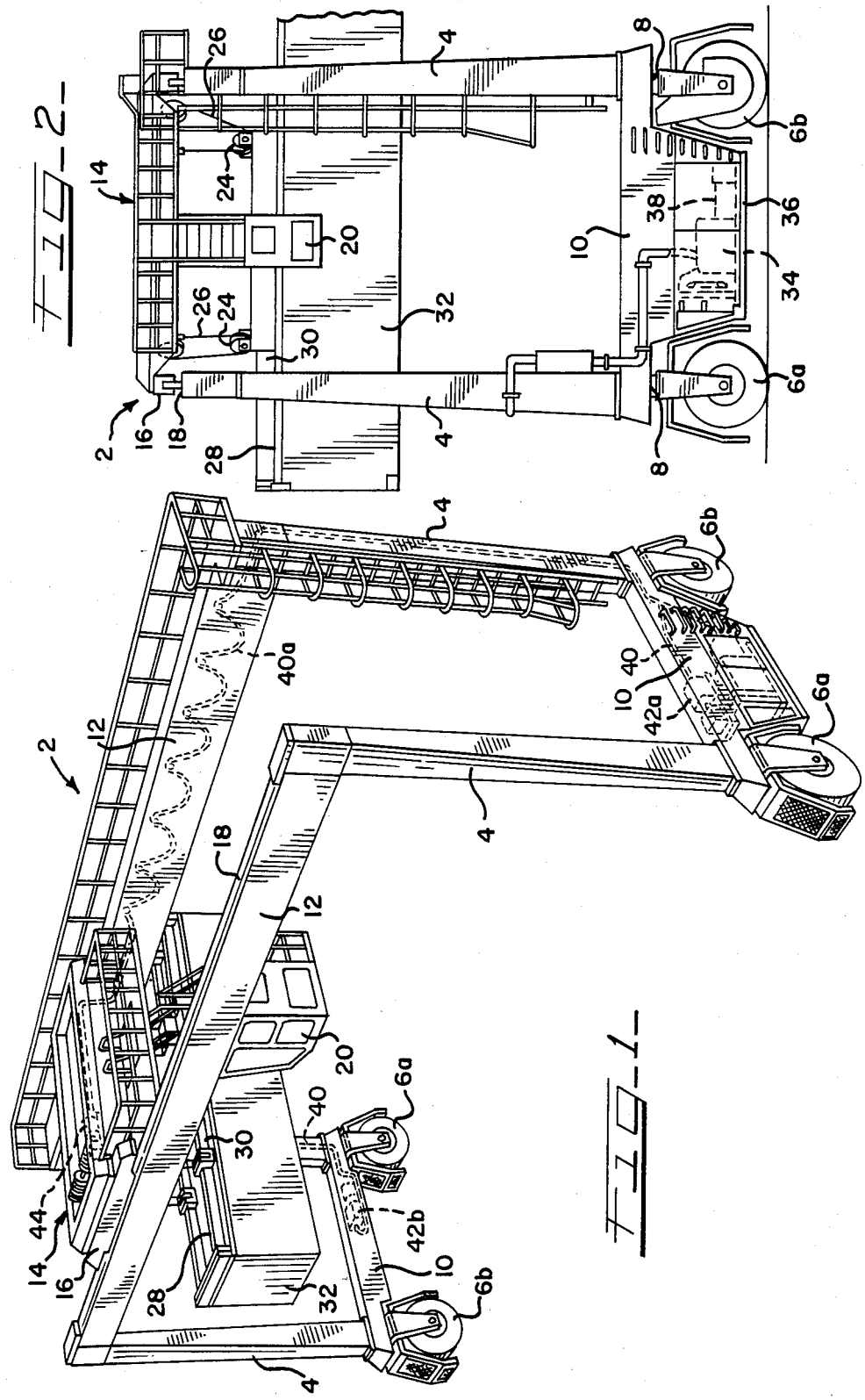

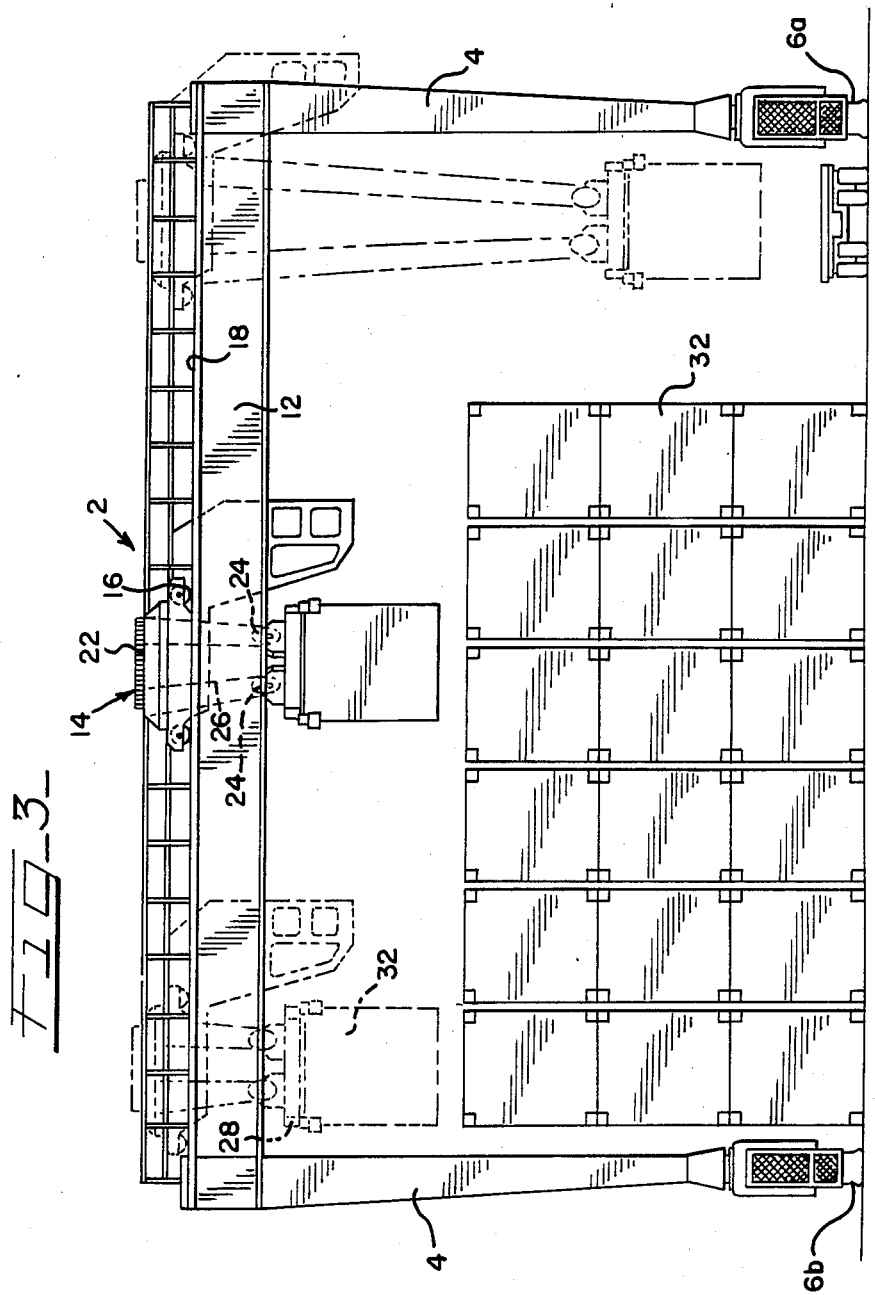

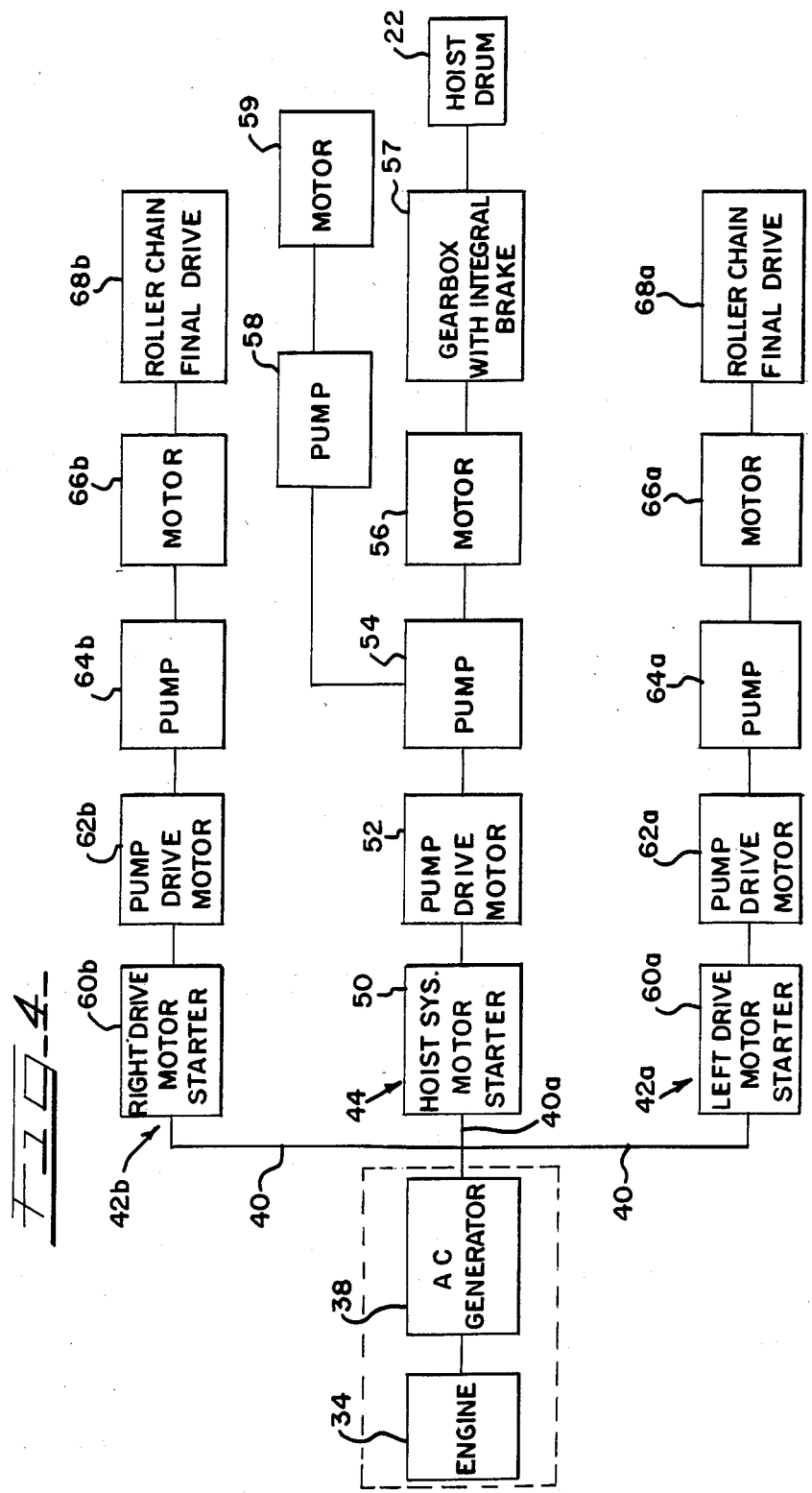

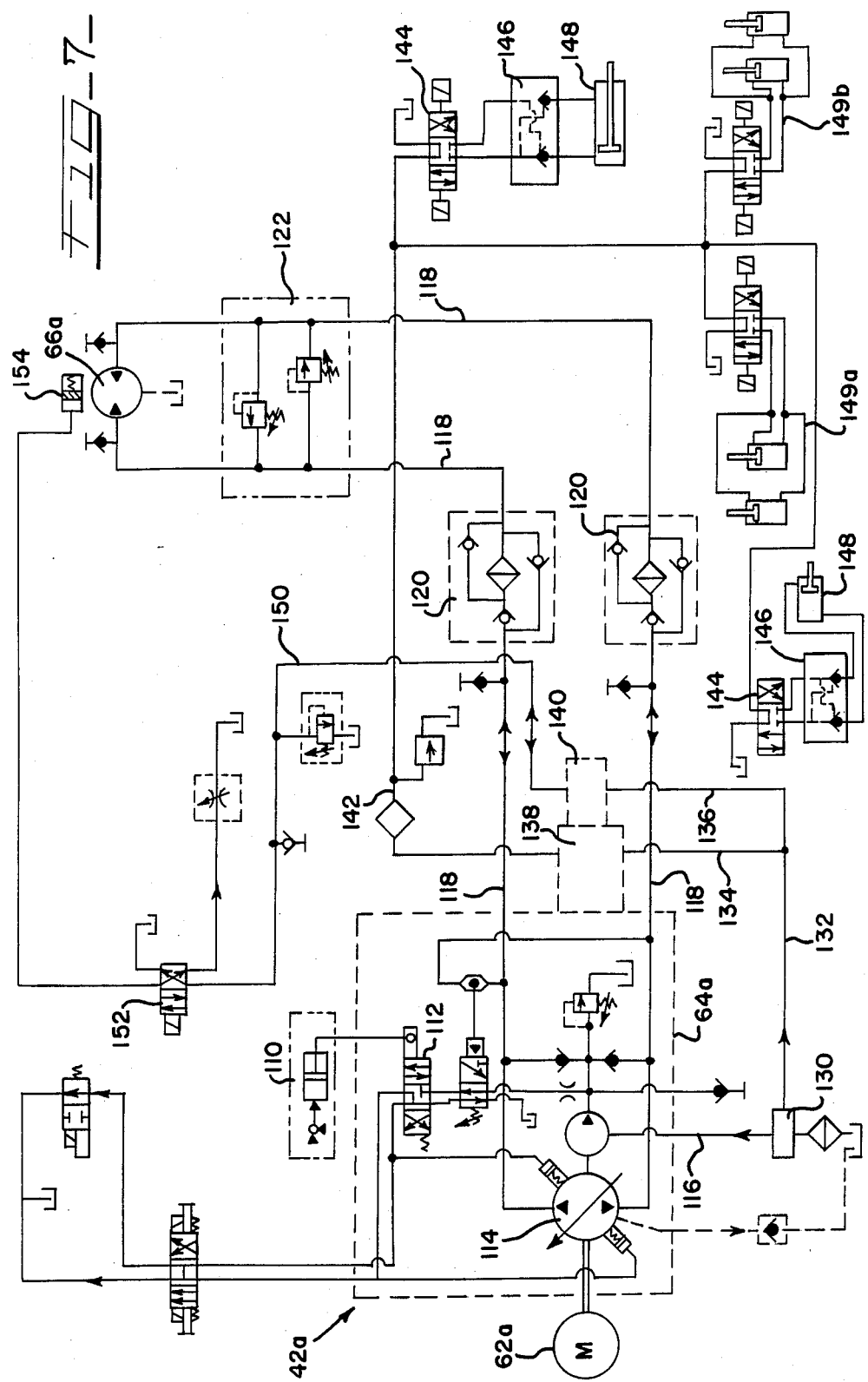

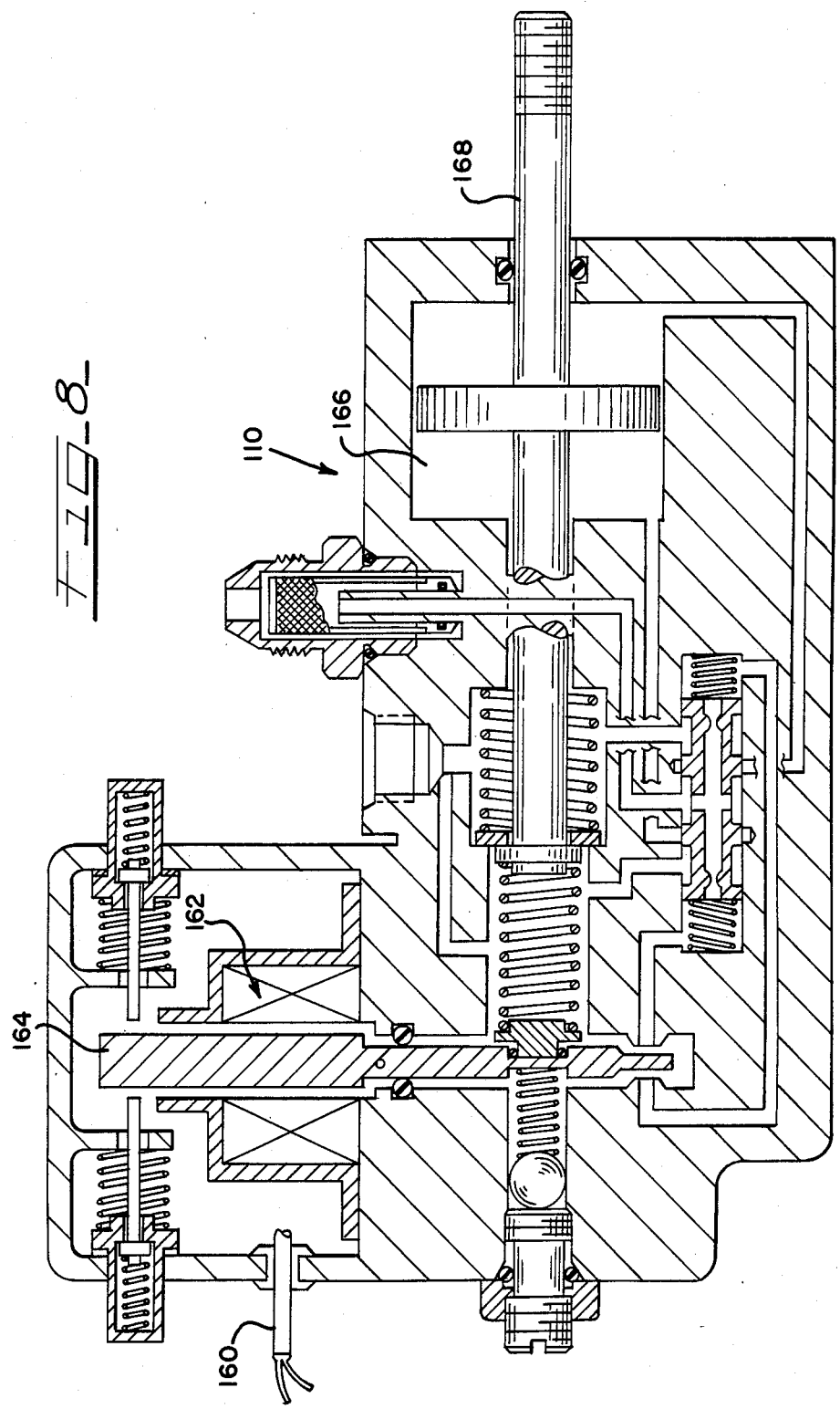

CRANE APPARATUS HAVING HYDRAULIC CONTROL SYSTEM

BACKGROUND OF THE INVENTION

1. Field of the Invention

The present invention generally relates to the handling of transport containers and, more particuarly, is concerned with an apparatus and method for controlling the operative functions of a crane apparatus through the use of an improved hydraulic control system.

2. Description of the Prior Art

In recent years, the use of large transport containers of several standardized forms has gained widespread use in industry. These containers permit the efficient transfer of cargo from ships to transporting vehicles, between different transporting vehicles, and to and from storage facilities. Because of the large size of cargo containers, it has been necessary to develop equipment having the capability of effectively handling the heavy loads required for their lifting and transport. One common apparatus for lifting and transporting containers from place to place is in the form of large, self-powered gantry cranes having several separate powered functions. The crane must deliver power to drive wheels, steering mechanisms and brakes. The equipment must also be capable of moving a bridge for positioning over the loads to be carried and of operating a hoist mechanism.

Conventional cranes require either DC power generation with its inherent complexities, such as brushes, commutators, etc., or require the use of resistor banks and various other high power electric devices in order to attain speed control. The devices themselves are complicated, cumbersome and expensive, because operative control must be imposed upon the full output power of the device. Other electric systems seeking to avoid the complexities of DC generation utilize AC generator sets. The AC current is then converted into a variable DC signal with the use of various types of static inverter systems. These devices, even though they have been improved over the last number of years through the use of solid state technology, are still very cumbersome, space consuming, and expensive techniques. Again, this is primarily because the control is actually controlling the full power flow.

The reliance on expensive electrical systems to govern the various power components of a crane increases its cost of manufacture and maintenance, and particularly requires sophisticated maintenance personnel. Consequently, a need exists for an improved system for controlling hoisting, traversing, driving and steering mechanisms of a gantry crane with improved operative characteristics and a simplified design for economy of manufacture, reliability, and ease of maintenance.

SUMMARY OF THE INVENTION

The present invention provides an improved hydraulic control system for controlling the operation of the various powered mechanisms required to operate a gantry crane or similar overhead equipment. The prime power source of the apparatus is arranged to drive an AC electrical generator. The output of the generator directs power to operate a plurality of variable displacement hydraulic pumps. The pumps are connected to separate hydraulic circuits to power mobile drive, braking and steering, and operation of the hoist and bridge. The hydraulic circuit includes various hydraulic motors responsive to the pump output to drive the crane, effect movement of the bridge, and operate and control the hoist drum. The operation of the hydraulic control circuits can be simply controlled through the use of an electrohydraulic servoactuator which moves the stroking mechanisms of the pumps. The pump stroker control is externally mounted and easily maintained in service and is reliable in operation. In the system of the invention, only a few watts of DC power is required to control the various functions of the crane without relying upon the complexities of DC generation used in prior electrical control.

The design of the hydraulic circuit of the invention permits modularization of each of the subsystems for ease of manufacture and serviceability. By using a modular design, the electrical motor and pump units of the hydraulic circuit can be mounted at locations close to the function that they are driving for greater efficiency. The drive control system thus attains infinite speed control without complicated electric circuits and components.

BRIEF DESCRIPTION OF THE DRAWINGS

FIG. 1 is a perspective view of a crane apparatus having the hydraulic control system of the invention;

FIG. 2 is a side elevational view of the crane apparatus of FIG. 1;

FIG. 3 is a front elevational view of the crane apparatus of FIG. 1;

FIG. 4 is a schematic block diagram of the hydraulic control system employed in the crane apparatus of FIG. 1;

FIG. 7 is a schematic diagram of the details of one of the drive hydraulic systems of the control of FIG. 4;

FIG. 8 is a sectional view of the pump stroker or servoactuator assembly employed in the hydraulic circuits of FIG. 6.

DESCRIPTION OF THE PREFERRED EMBODIMENT

Figure 5:
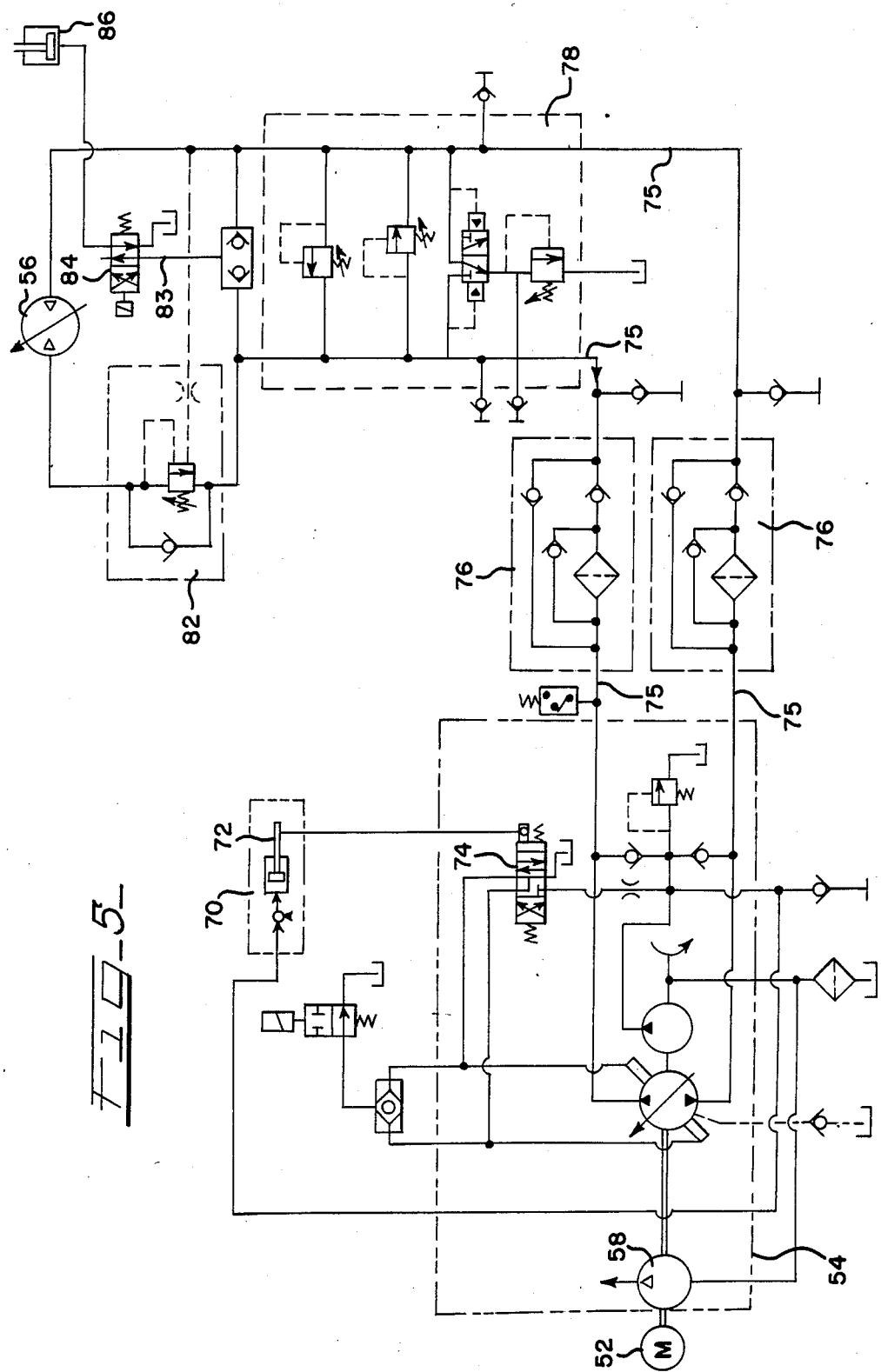
FIG. 5 is a schematic diagram showing details of the hoist hydraulic control system of the hydraulic system of FIG. 4.

Referring now to the drawings, and more particularly to FIGS. 1 to 3, there is shown the gantry crane apparatus, generally designated by reference number 2, which incorporates the preferred embodiment of the present invention. Although the crane apparatus 2 shown in FIGS. 1 to 3 illustrates specific conventional features, it is within the scope of the invention to utilize the hydraulic control system herein disclosed with other crane equipment which requires the control of multiple functions, such as driving, hoisting, and traversing. Gantry crane 2 is shown in a bridge-type overhead construction having a number of known features. The frame of the crane 2 includes four upright legs 4 supported by respective drive wheel assemblies 6a and idle wheel assemblies 6b. Each of the wheel assemblies 6a, 6b are pivotally attached to the lower end of the upright legs 4 for movement about a vertical axis through pivotal yoke assemblies 8. The lower portion of the crane 2 includes a pair of lower beams 10, while a pair of parallel upper beams 12, defining the width of the crane apparatus 2, are attached at the top of legs 4.

A bridge assembly 14 is mounfed for traverse movement upon the top of the upper lateral beams 12. Movement of the bridge assembly 14 is provided by a trolley assembly 16 which carries the bridge along a track like surface 18 at the top of the upper beams 12. As is conventional, an operator's cab 20 is carried beneath the bridge assembly 14 and also moves relative to the beam 12 as the bridge assembly 14 undergoes a traversing movement. A hoist drum 22 is rotatably mounted on the bridge assembly 14 and operates in conjunction with a pulley system 24. A cable 26 is wrapped around the periphery of the hoist drum 22 and is guided in contact with pulleys 24 to support, lift and lower a load suspended beneath the open frame of the crane 2. In FIGS. 1 and 2, a grappler assembly 28 is shown being suspended by the cable 26 and includes telescoping beams or spreaders 30 to accommodate containers 32 of varying lengths. The grappler includes attachment devices (not shown) that engage apertures at the surface of container 32 for lifting, lowering and carrying of the large loads being transported and manipulated.

The primary power plant driving the sub-functions of the crane apparatus 2 is of a typical design, such as a diesel engine well known in the art. The power plant 34 is supported on a platform 36 formed in one of the lower beams 10, as best shown in FIG. 2. A standard electrical generator 38 capable of generating a three-phase AC electrical signal is mounted adjacent the power plant 34 and is driven by its output. As best seen in FIG. 1, the AC output of generator 38 is transmitted by electrical conductors 40, 40a to the hydraulic control system of the invention to power the major sub-functions of the crane. To this end, output of generator 38 is supplied over electrical lines 40 to the hydraulic drive control system 42a, 42b. The hydraulic drive control systems 42a, 42b are positioned adjacent the respective drive wheel assemblies 6a to provide mobile drive of the crane 2, along with associated steering and braking functions. The AC power, which is applied over electrical line 40a, is received by the hoist hydraulic control system 44. Hoist control system 44 effects traverse movement of the bridge assembly 14 on tracks 18 and operates hoist drum 22 to raise and lower loads as is needed. The drive control system 42a, 42b and hoist hydraulic control system 44 can be manufactured in modularized form, and advantageously located at positions proximate to the function theyare driving, i.e. adjacent the respective drive wheel assemblies 6a or on the bridge assembly 14.

Referring now to FIG. 4, a block diagram of the hydraulic control system of the invention is shown. The AC output from generator 38 is transmitted over line 40a to the hoist control system 44. The hoist control system 44 includes a hoist system motor starter 50 of a conventional design that starts operation of pump drive motor 52. The pump drive motor 52 may comprise any standard three-phase, constant speed AC electric motor, such as, for example, a Model No. 5KS445SL218 electric motor manufactured by the General Electric Company, or any equivalent motor capable of generating a constant speed output. The output of the pump drive motor 52 is utilized to drive a variable displacement pump assembly 54, such as an Eaton Model No. 7620, or other pump capable of generating a bi-directional hydraulic output having a variable flow rate. Since the pump assembly 54 is a variable displacement device, it is at a zero displacement position when the drive motor 52 is started. This allows starting of the pump motor 52 under a no load condition and, therefore, the pump motor 52 will accelerate rapidly with a minimum time lag and thus within a minimum period of time during which in-rush AC current is drawn from the generator. The same advantage exists with the variable displacement pumps utilized in connection with the hydraulic drive systems 42a, 42b of the invention, as will be apparent.

The output of the variable displacement pump 54 is utilized to actuate a variable displacement hydraulic motor 56, such as a Sunstrand Model No. 26, and the like. The variable displacement motor 54 powers a drive gear box 57 which is operatively connected to the hoist drum 22 to cause its rotation to lift, lower, and otherwise carry the loads retained by the grappler assembly 28. The hoist drum drive gear box 57, generally with an integral brake, can be of a known design and further details of its structure are not necessary for an understanding of the invention. The hydraulic hoist control system 44 also includes a hydraulic line from the variable displacement pump assembly 54 to a bridge traverse pump 58 that operates a hydraulic bridge traverse motor 59 of conventional design, such as a Bignozzi Model No. E5-600 or other hydraulic motor. Selective activation of the pump assembly 58 and traverse motor 59 by the operator provides for the movement of the bridge assembly 14 along the upper beams 12 for positioning above the load.

The AC output of generator 38 is also directed to the dual hydraulic drive control system 42a and 42b that are utilized to drive the diagonally opposite drive wheel assemblies 6a at a selected speed. Each of the drive control systems 42a, 42b include a conventional electric drive motor starter 60a, 60b. The generator output operates AC pump drive motors 62a and 62b producing a constant speed output. Any AC electric motor is suitable for the pump drive motors 62a, 62b, such as a General Electric Model No. 5K365SL218 of lesser horsepower than pump drive motor 52. The constant speed output of the pump drive motors 62a and 62b drive variable displacement pumps 64a, 64b of a suitable capacity, such as a Sunstrand Model No. 25. The bi-directional, variable flow rate output of the pumps 64a, 64b are used to energize hydraulic motors 66a, 66b, such as a Bignozzi HD-1200 motor or other suitable hydraulic device. The output of the motors 66a, 66b respectively is coupled to roller chain final drives 68a, 68b that are respectively connected to the drive wheel assemblies 6a in a conventional manner to power movement of the gantry crane 2 as desired.

Referring now to FIG. 5, there is illustrated a schematic showing of a portion of the hoist hydraulic control system 44. The AC motor 52 of hoist system 44 is shown in driving relationship with the hoist pump assembly 54, which is enclosed by phantom lines in FIG. 5. Hydraulic fluid is delivered to the pump assembly 54 through an inlet line 54a. the pump assembly 54 is driven by the constant speed output of drive motor 52. Infinite variable control of the output of the pump assembly 54 is controlled by a linear electrohydraulic servoactuator 70, which is arranged to move the stroking mechanism of the pump 54 in a known manner. The output of the internal hydraulic cylinder within the servoactuator 70 is transmitted through rod 72 to a known valve assembly 74 coupled in the pump assembly 54. Valve 74 acts to regulate the stroking mechanism of the pump assembly 54 in a manner that infinite control of the direction and rate of flow of the hydraulic output of the pump 54 is achieved. The input to the servoactuator 70 is provided by a low voltage DC signal that can be conveniently controlled by a joystick or actuator within the operator's cab 20. Through the use of servoactuator 70, a minimal amount of electric current is sufficient to move the stroking mechanism of the hydraulic pump assembly 54, which enables smooth stepless control of one hundred or more useful output horsepower.

Still referring to FIG. 5, the output from pump assembly 54 is directed through dual hydraulic lines 75 having a respective filter 76. The two hydraulic lines 75 are directed through a standard transmission valve 78 are are interconnected by a shuttle valve 80 in communication with transmission valve 78. One of the hydraulic lines 75 further includes a counterbalance valve 82. Both hydraulic lines 75 are then connected in fluid communication with the variable displacement motor 56 to operate the hoist drum 22 at a selected rate established by the input to servoactuator 70. The shuttle valve 80 is also in selective communication with hydraulic line 83 having a brake control valve 84 and a hoist brake 86 for braking of the hoist drum 22.

Figure 6:
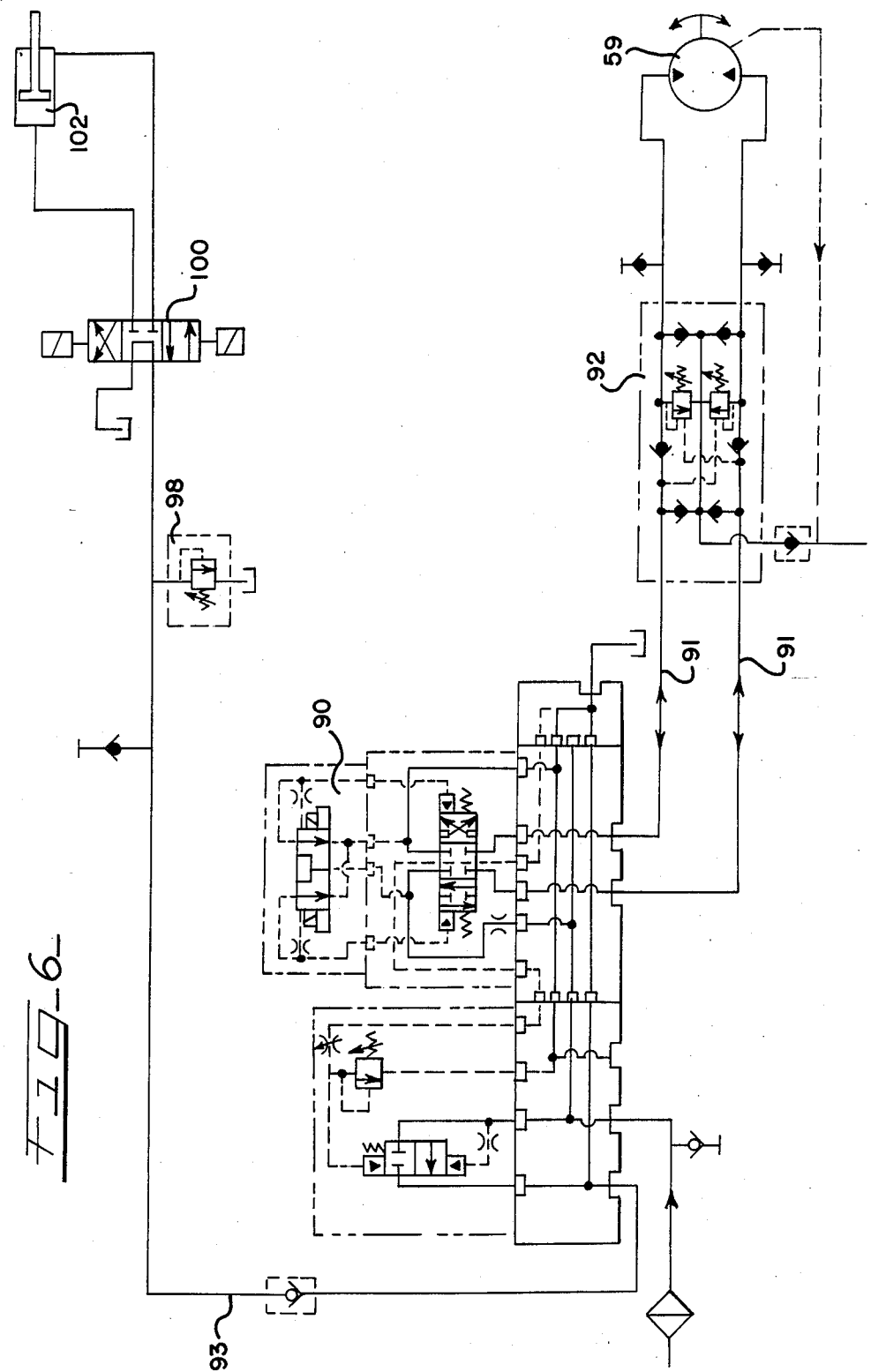
FIG. 6 is a schematic illustration of the hydraulic circuit controlling traverse drive and the bridge skew operable with the hoist control system of FIG. 5.

As was previously explained, the hoist hydraulic control system 44 may also be used to operate the bridge traversing motor 59. Motor 59 is employed to cause movement of the bridge assembly 14 aong the upper beams 12 in a traversing movement. Referring to FIG. 6, bi-directional hydraulic power is transmitted for operation of the traversing motor 59 through a traverse valve 90 from the traverse pump 58 illustrated in FIGS. 4 and 5. The traverse valve assembly 90 is used to control operation of the traverse motor 59 and is coupled in series through dual hydraulic lines 91 to a cushion lock valve 92 and to the traverse motor 59. In addition, traverse valve assembly 90 can control selective activation of a hydraulic line 93 having a relief valve 98 and a bridge skew valve 100. The bridge skew valve 100 regulates a hydraulic cylinder 102 which controls the selective skewed positioning of the bridge assembly 14 on the frame of the crane 2. From the foregoing, it should be apparent that hoisting and traversing movements of the bridge assembly are controlled by the hydraulic circuit 44.

Referring now to FIG. 7, further details of the hydraulic drive control system 42 are shown. The details of the hydraulic system 42b for the other drive wheel assembly are generally identical to the drive system shown in FIG. 7, and hydraulic drive assembly 42b need not be further described. In FIG. 7, AC pump drive motor 62a operates the drive pump assembly 64a in a manner similar to the drive motor 52 and pump 54 of the hoist hydraulic system 44. A DC electrohydraulic linear servoactuator 110 controls the rate of flow and the direction of the hydraulic output of the pump assembly 64a by controlling a valve assembly 112 which is operably connected to the primary pump element 114 of pump 64a. The input to the servoactuator 110 may be provided by a small DC signal in the same manner as servoactuator 70 described in connection with the hoist hydraulic control system 44 for control of the stroke of the pump assembly 54.

Pump assembly 64a is supplied hydraulic fluid from a suitable source through an inlet line 116. The bidirectional pump output is delivered through hydraulic lines 118 having bi-flow filters 120. A cross relief valve 122 is arranged between filters 120 and a hydraulic drive motor 66a as previously described. The drive motor 66a then transmits power to one of its associated wheel assemblies 6a in a manner that the crane 2 may be driven at a speed determined by the DC input to the pump stroker actuator 110. It should be apparent that power is delivered to the opposite drive motor 6a in hydraulic drive control system 60b to provide dual drive on the crane.

The drive hydraulic system 42a is also used to operate the brake and steering functions of crane 2. Hydraulic fluid is delivered from a manifold 130 in inlet line 116 over hydraulic lines 132, having branches 134, 136. Hydraulic line 134 supplies hydraulic fluid to yoke rotation pump 138, while hydraulic fluid is delivered to brake pump 140 through hydraulic line 136. The yoke rotation pump 138 delivers hydraulic power through line 142, yoke rotation valves 144, and double lock valves 146 to a pair of yoke rotation cylinders 148. The yoke rotation cylinders 148 are operably connected to the wheel assembly 6a in a known manner to cause rotation of the wheels about a vertical axis to effect steering control. The yoke rotation pump 138 also delivers hydraulic pressure to 90° position lock cylinders 149a and 0° position lock cylinders 149b. Likewise, the hydraulic pressure delivered by brake pump 140 is transmitted over line 150 to a brake control valve 152 and a brake caliper 154 for selective braking during operation.

Referring now to FIG. 8, there is shown a sectional view of the servoactuator 110. The structure of the servoactuator is of a standard design and is shown merely to illustrate the conversion of electrical current to a variable displacement output. The design of actuator 110 is similar to the pump stroke controller 70 utilized in conjunction with the hoist hydraulic control system 44. In operation, DC current, which is variable in accordance with the position of a control member, such as a joystick within the cab 20 of the crane 2, is applied through electrical lines 160. A solenoid 162 responds to the DC input by moving core element 164 to a variable position to control the pressure differential established on opposite sides of cylinder 166 of linear actuator 110 by a well-known technique. The pressure differential thus affects the output position of rod 168 and control of stroker valve 112 shown in FIG. 7.

We claim:
1. An overhead crane comprising:
    frame means having a pair of upper beams to form generally parallel tracks;
    a bridge extending across said upper beams and arranged to move along said tracks;
    wheel means rotatable supported beneath said frame means, drive means operatively coupled to said wheel means for causing movement of said frame means;
    hoist means mounted on said bridge, said hoist means having a rotatably mounted hoist drum;
    cable means operatively attached to said drum and being suspended downward from said drum;
    grappler means carried by the lower portion of said cable means for carrying and releasing one or more containers;
    a single electrical generator carried by said frame;
    separate hydraulic means, each hydraulic means being operatively connected to separate electric motors which are drivable by said single electrical generator, one of said hydraulic means being each operatively coupled to each of said bridge, said drive means, and said hoist drum, said hydraulic means acting selectively to move said bridge along said tracks, to drive said drive means to cause movement of said frame means and to rotate said drum hoist for lifting and lowering said containers; and control means connected to each of said hydraulic means for independently controlling the operations of said bridge, said drive means, and said hoist drum.

2. The overhead crane of claim 1 wherein each of said hydraulic means includes an electric motor powered by said generator means, a hydraulic pump being driven by said electric motor and producing a variable output flow rate, and a hydraulic motor responsive to said variable output for driving said drive means.

3. The overhead crane of claim 2 further comprising pump control means for selectively controlling the variable hydraulic output flow rate of said pump.

4. The overhead crane of claim 3 wherein said generator means generates an AC electrical output power to drive said electric motor, each electric motor having a constant speed output for driving said hydraulic pump.

5. The overhead crane of claim 4 wherein said control means regulates the stroke of said hydraulic pump.

6. The overhead crane of claim 5 wherein each pump control means is responsive to a variable DC electrical input signal to regulate the output of said hydraulic pump.

7. The overhead crane of claim 2 further comprising another electric drive motor, said hydraulic means having a second hydraulic pump being driven by said another electric drive motor and producing a variable hydraulic output flow rate, said hydraulic means further having a variable displacement fluid motor for rotating said hoist drum, and second control means coupled to said second hydraulic pump for controlling the variable output of said second hydraulic pump for regulating the rotation of said hoist drum.

8. The overhead crane of claim 7 wherein said single electrical generator generates an AC electrical output power, each electric motor and said another electric motor producing a constant speed output, said control means and said second control means acting to vary the rate of output flow of said first and second hydraulic pumps for regulating said hydraulic motors operating said drive means and rotating said hoist drum.

9. The overhead crane of claim 8 further comprising a bridge traverse pump being coupled to the output of said second hydraulic pump, a third hydraulic motor and hydraulic pump coupled to said bridge to cause said movement in response to said output of the third hydraulic pump.

10. The overhead crane of claim 9 wherein said hydraulic pumps are variable displacement pumps.

11. The overhead crane according to claim 10 wherein said control means and said second control means provides infinite control of the rate of flow of the output flow from said hydraulic pumps.

12. In an overhead crane, defining a plurality of hydraulically driven subsystems, The improvement comprising, in combination:

a single electrical generator carried by said overhead crane; separate hydraulic means for driving each of said subsystems, each of said hydraulic means being operatively connected to separate electric motors, and means for independently driving each of said separate electric motors by means of said single electrical generator whereby each of said subsystems obtain their power for operation from the same generator means; one of said hydraulic means and operatively connected, separate electric motors is connected to operate a bridge subsystem of said overhead crane; another of said hydraulic means and operatively connected separate electric motor is connected to operate drive means on one side of the overhead crane; and a third hydraulic means and operatively connected separate eletric motor is connected to operate drive means on the other side of said overhead crane.

13. The overhead crane of claim 12, including control means connected to each of said hydraulic means and operatively connected separate electric motors independently controlling the operations of said bridge and drive means on opposite sides of the overhead crane.

14. The overhead crane of claim 13 in which said single electrical generator generates AC power.

* * * * *